United States Patent
Zamoshchik

(10) Patent No.: US 12,331,210 B2
(45) Date of Patent: Jun. 17, 2025

(54) COMPOSITION FOR FORMING A PATTERNED METAL FILM ON A SUBSTRATE

(71) Applicant: OrelTech Ltd., Rehovot (IL)

(72) Inventor: Natalia Zamoshchik, Rehovot (IL)

(73) Assignee: OrelTech Ltd., Rehovot (IL)

( * ) Notice: Subject to any disclaimer, the term of this patent is extended or adjusted under 35 U.S.C. 154(b) by 245 days.

(21) Appl. No.: 18/302,531

(22) Filed: Apr. 18, 2023

(65) Prior Publication Data

US 2023/0257613 A1 Aug. 17, 2023

Related U.S. Application Data

(63) Continuation-in-part of application No. 15/491,036, filed on Apr. 19, 2017, now Pat. No. 11,661,527, which is a continuation of application No. PCT/US2015/056438, filed on Oct. 20, 2015.

(60) Provisional application No. 62/066,392, filed on Oct. 21, 2014.

(51) Int. Cl.
C09D 11/52 (2014.01)
C09D 11/322 (2014.01)

(52) U.S. Cl.
CPC ............ C09D 11/52 (2013.01); C09D 11/322 (2013.01)

(58) Field of Classification Search
CPC ..... C09D 11/037; C09D 11/322; C09D 11/38; C09D 11/52; C09D 11/033; B41M 3/006; B41M 5/0023; B41M 5/0047; B41M 5/007; B41M 7/00; B41M 7/0081; C23C 18/06; C23C 18/08; C23C 18/145; C23C 4/02; C23C 4/134; C23C 18/1233; C23C 18/125; C23C 18/14; H05H 1/46; H05H 2245/40; H05H 1/4645
See application file for complete search history.

(56) References Cited

U.S. PATENT DOCUMENTS

| | | | |
|---|---|---|---|
| 5,312,529 A | 5/1994 | Antonelli et al. |
| 5,723,535 A | 3/1998 | Krismer et al. |
| 5,997,622 A | 12/1999 | Weber et al. |
| 6,491,967 B1 | 12/2002 | Corderman et al. |
| 7,115,161 B2 | 10/2006 | Magdassi et al. |
| 7,258,899 B1 | 8/2007 | Sharma et al. |
| 7,364,920 B2 | 4/2008 | Braun et al. |
| 7,803,221 B2 | 9/2010 | Magdassi et al. |
| 8,163,077 B2 | 4/2012 | Eron et al. |
| 8,987,029 B2 | 3/2015 | Chinn et al. |

(Continued)

FOREIGN PATENT DOCUMENTS

| | | |
|---|---|---|
| CN | 101010388 A | 8/2007 |
| EP | 1323846 A2 | 7/2003 |

(Continued)

OTHER PUBLICATIONS

Chinese 2nd Foreign Action dated Feb. 20, 2019 from the State Intellectual Property of the P.R.C. for Chinese Patent Application: 2015800650708, China.

(Continued)

*Primary Examiner* — Frances Tischler
(74) *Attorney, Agent, or Firm* — M&B IP Analysts, LLC

(57) ABSTRACT

A composition for forming a patterned thin metal film on a substrate is presented. The composition includes metal cations; and at least one solvent, wherein the patterned thin metal film is adhered to a surface of the substrate upon exposure of the at least metal cations to a low-energy plasma.

16 Claims, 6 Drawing Sheets

(56) References Cited

U.S. PATENT DOCUMENTS

| | | |
|---|---|---|
| 9,107,275 B2 | 8/2015 | Magdassi et al. |
| 2003/0136518 A1 | 7/2003 | Shanov et al. |
| 2007/0184208 A1 | 8/2007 | Sharma et al. |
| 2007/0248838 A1 | 10/2007 | Saint-Romain |
| 2007/0261595 A1 | 11/2007 | Johnson et al. |
| 2010/0178432 A1 | 7/2010 | Kondo et al. |
| 2010/0282168 A1 | 11/2010 | Kishimoto et al. |
| 2011/0059234 A1 | 3/2011 | Byun et al. |
| 2011/0117338 A1 | 5/2011 | Poquette et al. |
| 2012/0204950 A1 | 8/2012 | Magdassi et al. |
| 2013/0106942 A1 | 5/2013 | Kim et al. |
| 2014/0166616 A1 | 6/2014 | Shanker et al. |
| 2015/0056381 A1 | 2/2015 | Hori et al. |
| 2015/0083474 A1 | 3/2015 | Kawamura et al. |
| 2015/0240091 A1 | 8/2015 | Tabayashi et al. |
| 2015/0289383 A1 | 10/2015 | Yoshihara et al. |

FOREIGN PATENT DOCUMENTS

| | | |
|---|---|---|
| EP | 1724121 A1 | 11/2006 |
| EP | 2351872 A1 | 8/2011 |
| JP | 2043352 A | 2/1990 |
| JP | H02208206 A | 8/1990 |
| JP | 2000319432 A | 11/2000 |
| JP | 2010283002 A | 12/2010 |
| RU | 01823932 A3 | 6/1993 |
| RU | 2009271 C1 | 3/1994 |
| RU | 2066706 C1 | 9/1996 |
| RU | 770260 A1 | 5/1997 |
| RU | 2462536 C1 | 5/2012 |
| WO | 2006093398 A1 | 9/2006 |
| WO | 2013129118 A1 | 9/2013 |
| WO | 2014072969 A1 | 5/2014 |

OTHER PUBLICATIONS

Chinese Foreign Action dated Sep. 5, 2018 from the State Intellectual Property of the P.R.C. for Chinese Patent Application: 2015800650708, China.

EP Search Report for Application No. EP 15851864.7 dated Oct. 17, 2017, EPO, The Hague.

European Search Report for EP Application No. 15852271.4 from the EPO dated Sep. 5, 2017, The Hague.

Genish, et al., "Coating Dielectric Substrates by Plasma-Reduction of Metallic Ions in Solvents," Surface & Coatings Technology, vol. 204, Ramat-Gan, Israel, 2006, pp. 1347-1352.

Ghosh, et al., "Fabrication of Electrically Conductive Metal Patterns at the Surface of Polymer Films by Microplasma-Based Direct Writing," American Chemical Society, 2014, Cleveland, OH., vol. 6, pp. 3099-3104.

Hou et al., "Separation of organic liquid mixture by flexible nanofibrous membranes with precisely tunable wettability", NPG Asia Materials (2016), Dec. 2, 2016.

Irzh, et al., "Deposition of Air-Stable Zinc Nanoparticles on Glass Slides by the Solvent-Assisted Deposition in Plasma (SADIP) Method," J. Phys. Chem C., Ramat Gan, Israel, 2009, vol. 113, pp. 14097-14101.

Jin, et al., "Packaging Printing", Printing Industry Press, Jul. 1997, pp. 11-13.

Kafitin E.D., "Plasma Processing of Metals," Niitavtoprom Company, Moscow, RU, 1969, p. 60.

Koo, et al., "Low Temperature Plasma-Chemical Treatment of PdCl2 Film by Atmospheric Pressure Hydrogen Plasma," Science Direct, Thin Solid Films 506-507, Suwon, Korea, 2006, pp. 350-354.

Notice of Deficiencies for EP15852271.4, Oct. 7, 2019, EPO, Rijswijk, The Netherlands.

Notice of Deficiencies for European Application No. 15851864.7, Oct. 7, 2019, EPO, Rijswijk, The Netherlands.

Notice of Deficiency for European Patent Application No. 15851864.7, Apr. 9, 2019, EPO, Netherlands.

Notice of Deficiency for European Patent Application No. 15852271.4, Apr. 9, 2019, EPO, Netherlands.

Notice of Preliminary Rejection for Korean Patent Application No. 10-2017-7013813, dated Aug. 30, 2021, Korean Intellectual Property Office—KIPO, Daejeon, Republic of Korea.

Notice of the Decision on Rejection for Chinese Application No. 201580065070.8, Aug. 6, 2019, China, CNIPA.

Nugent, Paul, "Rotational Molding", Applied Plastics Engineering Handbook, 2017, pp. 321-343.

O'Connell, et al., "Nanoscale Platinum Printing on Insulating Substrates", Nanotechnology, IOP, Bristol, GB, vol. 24. No. 50, 2013, pp. 1-12.

Parmar et al., "Influence of Microwaves on the Water Surface Tension", Langmuir: ACS Publications: 2014 American Chemical Society, pp. 9875-9879.

Patent Cooperation Treaty The International Search Report and the Written Opinion for PCT/US2015/056435, ISA of Moscow, RU, Date of Mailing: Feb. 18, 2016.

Petasch, et al., "Low-Pressure Plasma Cleaning: a Process for Precision Cleaning Applications," Surface and Coatings Technology, 1997, pp. 176-181.

The 2nd Chinese Foreign Action from the China National Intellectual Property Administration, CNIPA for Chinese Patent Application: 2015800642843, China. dated Sep. 27, 2020.

The 3rd Chinese Foreign Action from the China National Intellectual Property Administration, CNIPA for Chinese Patent Application: 2015800642843, China. dated Dec. 14, 2020.

The First Chinese Office Action for Chinese Patent Application No. 2015800642843 dated May 7, 2020, CNIPA, China.

The International Search Report and The Written Opinion of the International Searching Authority for PCT/US2015/056438, Mailed on May 5, 2016, ISA/RU, Moscow, Russia.

The Notice of Final Rejection for Korean Application No. 10-2017-7013813, The Korean Intellectual Property Office (KIPO), dated: Mar. 7, 2022.

Uchiyama et al., Spontaneous Pattern Formation Induced by Bénard-Marangoni Convection for Sol-Gel-Derived Titania Dip-Coating Films: Effect of Co-solvents with a High Surface Tension and Low Volatility, Langmuir: ACS Publications: 2015 American Chemical Society, pp. 12497-12504.

COMPOSITION FOR FORMING A PATTERNED METAL FILM ON A SUBSTRATE

CROSS-REFERENCE TO RELATED APPLICATIONS

This application is a continuation-in-part of U.S. Non-provisional application Ser. No. 15/491,036 filed on Apr. 19, 2017, PCT application No. PCT/US2015/056438 filed on Oct. 20, 2015 which claims the benefit of U.S. Provisional Application No. 62/066,392 filed on Oct. 21, 2014, the contents of which are hereby incorporated by reference in their entirety.

TECHNICAL FIELD

The present disclosure relates generally to techniques and an ink composition for forming conductive material on substrates, and in particular to techniques for fabricating or printing thin patterned metal films on substrates.

BACKGROUND

The field of organic and printed flexible electronic devices is a fast growing field with a wide range of applications in the fields of light emission, light-energy conversion, microelectronics, and macro electronics. For example, organic field-effect transistors (OFETs) and organic light-emitting diodes (OLEDs) have garnered great interest due to their technological potential as a cheap alternative to inorganic, e.g. silicon-based, thin-film transistors and diodes. Further, organic electronics may provide electronic circuits with new attractive properties, such as flexibility and transparency. The structure of an organic electronic device may include a single layer or multiple layers of organic materials and patterned metal features (e.g., electrodes). However, the formation of electrical contacts with the organic layers has not yet matured to an efficient industrial fabrication process. This is due mainly to the cost, materials, and fabrication techniques that are being used.

Specifically, utilization of organic materials in electronic devices or circuits places certain restrictions on the fabrication processes which ultimately limit the functionality of the resulting fabricated organic electronic devices. This is due to the low decomposition temperature of organic compounds as well as their relatively high susceptibility to undesired chemical reactions that destroy their functionality arising during fabrication.

The physical vapor deposition (PVD) technique is one of the fabrication techniques utilized for forming metal electrodes with organic layers. The PVD technique uses a physical process, such as heating or sputtering, to produce a vapor of material, which is then deposited on the object which requires coating. The PVD process is typically used in the manufacture of items which require thin films for mechanical, chemical or electronic reasons. Examples include semiconductor devices such as thin film solar panels.

The PVD process is mainly based on vapor deposition approaches that are prone to damaging the organic active components. For example, when the PVD method is utilized, the metal material is evaporated from a solid source onto a substrate located at a certain distance from the source. Further, when the PVD is utilized, the whole process is performed in a vacuum chamber. During the process, high-energy metal atoms "bombard" the substrate surface and are able to penetrate into organic materials, thereby substantially damaging the organic surface. The damage and the loss of the evaporated metal associated with the use of the PVD process limits the cost efficiency of the PVD method for preparing organic electronic devices.

Another fabrication technique utilized for forming metal electrodes organic layers is chemical vapor deposition (CVD). During a CVD fabrication process, the organic substrate is exposed to highly reactive and aggressive reagents in the reaction chamber which are harmful to the organic substrates.

Other techniques for forming metal films on substrates include inkjet printing, screen printing, aerosol printing, and nanoimprint lithography, all of which use nanoparticle dispersion. In most implementations, the "ink" used in these printing processes is based on organic-ligand stabilized dispersions of metal nanoparticles or metal organic compounds. The ink-based printing of metal films can be integrated in large-scale manufacturing systems for electronic devices. However, existing ink-based printing processes are very expensive due to the cost of such ink compositions. Specifically, the manufacturing of the ink is expensive because of the number of processing steps associated with synthesis, dispersion, purification, and concentration of the ink solution. Further, using currently available ink solutions requires heating of the solution when applied on the substrate in order to form the film.

For example, an ink composition for printing on a ceramic substrate utilized in existing solutions includes in part submicron particles acting as a binding composition and having a melting point below 600° C. Such a binding composition becomes an integral part of the substrate upon exposure to temperatures above the melting point of the binding composition.

It would therefore be advantageous to provide a method, system and an ink composition for forming a patterned metal film on a substrate that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include an ink composition for forming a patterned thin metal film on a substrate. The ink composition comprises metal cations; and at least one solvent, wherein the patterned thin metal film is adhered to a surface of the substrate upon exposure of the at least metal cations to a low-energy plasma.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be appar

DETAILED DESCRIPTION

Figure 1A:
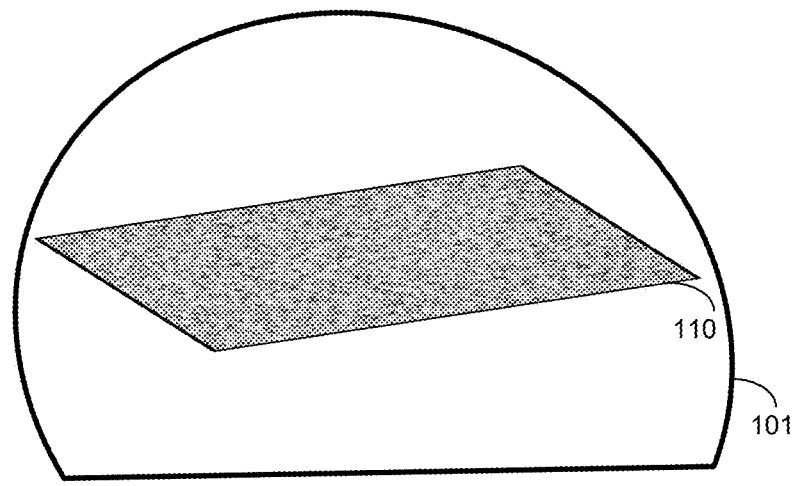
- FIG. 1a through 1e are diagrams illustrating the process of forming a thin patterned metal film on a substrate according to an embodiment

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, an ink composition, a machine, and a process for forming thin patterned metal films on a substrate are disclosed. The process for forming the metal films may be any fabrication, manufacturing, and/or printing process. The disclosed process is based, in part, on exposing a substrate having portions thereof coated with the ink composition to plasma for a predefined period of time.

The plasma is low energy plasma, such as radio frequency (RF) plasma or another non-thermal plasma. The use of low energy plasma enables the conduction of a chemical reaction without creating high temperatures on the surface of the substrate. Thus, the disclosed process would not damage or otherwise harm the surface or deeper layers of the substrate. It should be noted that the metal film includes any metal feature that can be adhered or bounded to the film. Furthermore, "metal" of the metal film as referred to herein includes any metals, metal alloys, and/or mixtures of various types of metals.

The patterned metal features may be electrodes or any passive electrical element. Therefore, the forming process and ink composition disclosed herein allows for low-cost and mass-manufacturing of electronic devices including, but not limited to, frequency identification tags (RFIDs), electronic sensors, integrated electronic circuits, flexible displays, photovoltaic devices, organic field effect transistors (OTFTs or OFETs), organic light emitting diodes (OLEDs), and the like.

FIGS. 1a through 1e are exemplary and non-limiting diagrams illustrating a process of forming a thin patterned metal film on a substrate according to an embodiment. Referring to FIG. 1a, the process is performed over a substrate 110. The substrate 110 can be made of materials including, but not limited to, organic materials, ceramic, silicon, glass, cellulose nanofibers, and the like. In addition, the substrate 110 may be made of materials sensitive to high temperatures such as, but not limited to, polyethylene terephthalate (PET), polyimide, polyethylene naphthalate (PEN), and the like. Such substrates are typically in a form of films or sheets. In an embodiment, the substrate 110 may be prepared solely from organic materials, solely from inorganic materials, or from a combination or hybrid of organic and inorganic materials.

In an embodiment, prior to film formation, the substrate 110 may optionally be first cleaned using a proper procedure for cleaning substrates. In an exemplary embodiment, a sonication cleaning procedure using a cleaning solution (such as, e.g., Isopropyl alcohol) can be utilized. It should be noted that other cleaning procedures may be utilized without departing from the scope of the disclosed embodiments. One of ordinary skill should be familiar with other cleaning procedures that can be used for this purpose.

The substrate 110 is treated so only desired areas of the surface of the substrate 110 will react with, or be exposed to, an ink composition, when such composition is applied. The desired areas include one or more patterns where the patterned metal film(s) will be formed. In certain implementation, a mask is first placed on the substrate's surface to mark the desired areas. Such a mask can be further used when applying the ink composition on the substrate. In an embodiment, such treatment is performed by exposing the substrate 110 to a low-energy and non-thermal plasma, such as Oxygen plasma. To this end, the substrate 110 is placed in a first chamber 101 and exposed to Oxygen plasma in a first exposure as determined by a first set of exposure parameters including, for example, power, RF frequency, gas flow rate, and time duration. The values of the first set of exposure parameters are determined based, in part, on the type of the substrate 110.

In certain embodiments, an atmospheric plasma (e.g., of Oxygen) is utilized. Exposing the substrate to the atmospheric plasma can be performed using an atmospheric plasma jet, an atmospheric plasma spray, a dielectric barrier discharge, and the like. Thus, in this embodiment, the chamber 101 is not required. As noted above, the low-energy and non-thermal plasma are used regardless of whether the chamber 101 is used. The temperature range of the substrate that is exposed to the plasma is between 50° C. and 70° C.

Figure 1B:
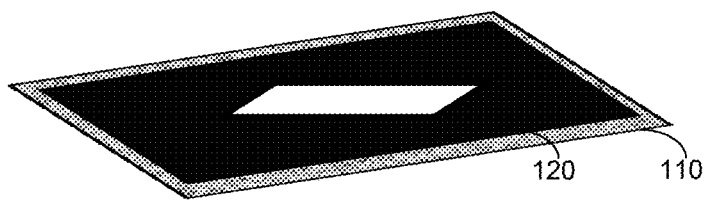

Referring to FIG. 1b, after cleaning and/or treating the substrate 110, a mask 120 is applied to create the desired pattern. The mask 120 ensures that the ink composition is applied to the substrate 110 only in the desired pattern to form the thin patterned metal film. In this example, the pattern is a rectangular stripe.

According to some embodiments, shadow masking is utilized such that a polymeric mask 120 is applied directly to the surface of the substrate 110. In such embodiments, voids (spaces) in the mask 120 define where the ink composition contacts the substrate's 110 surface. As noted above, the mask 120 can also be used for pre-treating the substrate.

Figure 1C:
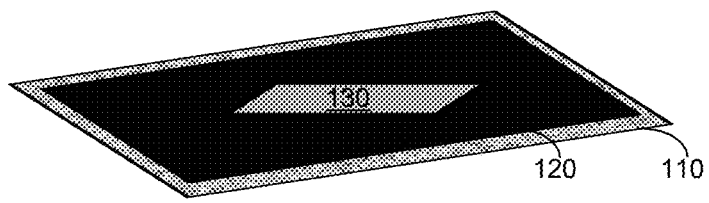

Referring now to FIG. 1c, the ink composition 130 is applied on the substrate 110, specifically to areas not covered by the mask 120. In an embodiment, the ink composition 130 is applied by a means including, but not limited to, drop-casting, spin-coating, spray-coating, immersion, flexography, gravure, inkjet printing, aerosol jet printing, contact imprinting, and the like.

Figure 1D:
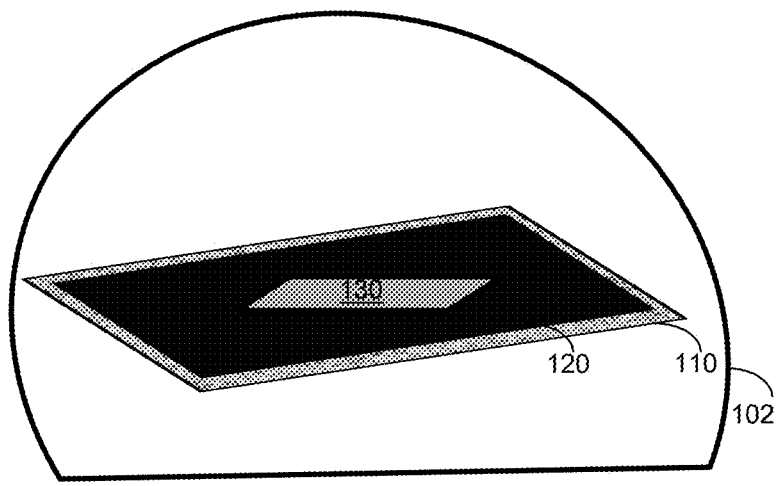

Referring now to Referring to FIG. 1d, the substrate 110 including the mask 120 and the ink composition 130 is placed in a second chamber 102 and exposed to plasma gas in a second exposure as determined by a second set of exposure parameters. The plasma gas utilized in the second phase in the chamber 102 includes an inert gas such as Argon, Nitrogen, and the like. The second exposure parameters include, for example, power, frequency, gas flow rate, and time duration. The values of the second set of exposure parameters are determined based, in part, on the type of the substrate 110, the ink composition 130, and/or the means of application. It should be noted that the chamber 102 may be a vacuum chamber. It should be further noted that the chambers 101 and 102 may be the same chamber such that the first and second exposures differ only in the type of gas flowing through the chamber in each phase. The mask 120 may be removed after applying the composition 130. The mask 120 may further remain for the duration of the second exposure and removed thereafter.

In certain embodiments, an atmospheric plasma of an inert gas such as, e.g., Argon or Nitrogen plasma, is utilized also during the second exposure. Exposing the substrate to the atmospheric plasma can be performed using an atmospheric plasma jet, an atmospheric plasma spray, a dielectric barrier discharge, and the like. Thus, in this embodiment, the chamber 102 is not required. As noted above, the low-energy and non-thermal plasma are being used regardless if the chamber 102 is being used. Therefore, the temperature range that the substrate is exposed to, also in this phase, is between 50° C. and 70° C.

Figure 1E:
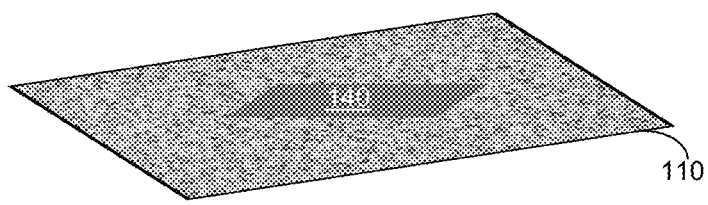

Referring now to FIG. 1e, as a result for the exposure to the Argon or Nitrogen plasma, the substrate 110 is covered by the thin patterned metal film 140 shaped in the pattern of the mask 120. The chemical and electrical properties of the thin patterned metal material film 140 are determined based on the chemical properties of the ink composition 130 and the substrate 110 as well as based on the exposure parameters of the exposure to the Argon or Nitrogen plasma. For example, the thickness of the patterned metal film 140 can be controlled by modifying the concentration of the metal in the ink composition 130, the duration of the exposures to the plasma in the second phase, and/or the number of plasma exposure "treatments". Additional examples for chemical and electrical properties are described further herein below.

Figure 2:
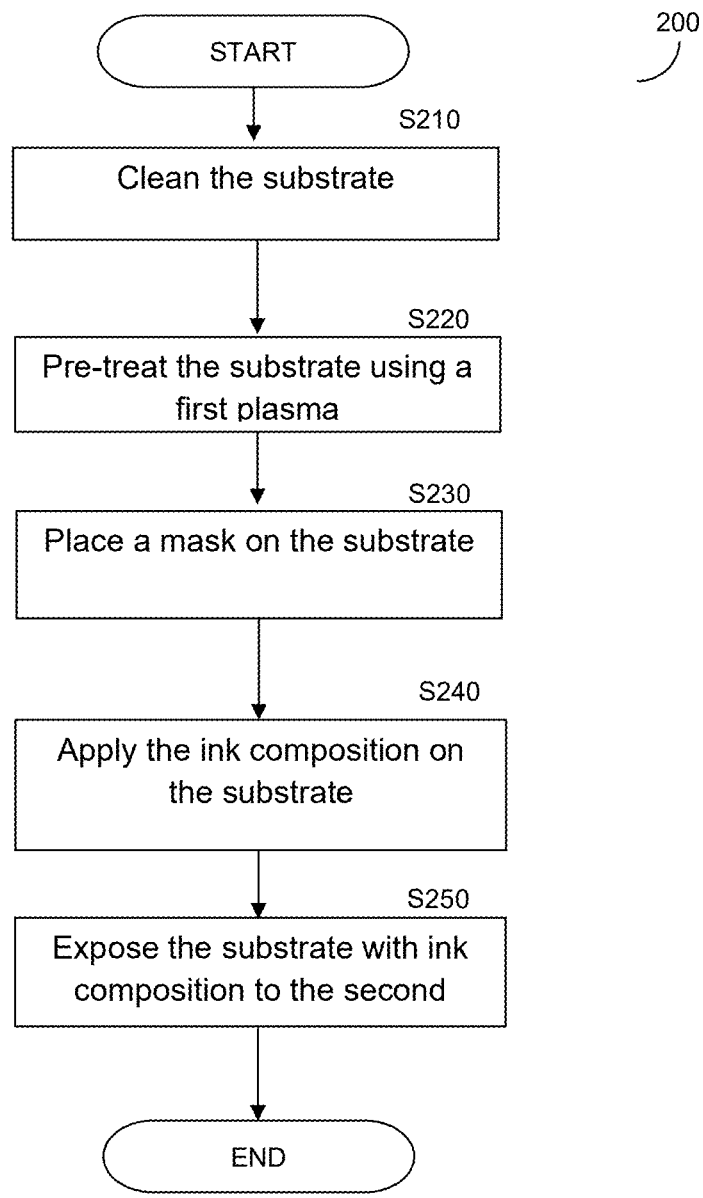
FIG. 2 is a flowchart illustrating a method for forming thin patterned metal films on substrates using plasma according to an embodiment

FIG. 2 is an exemplary and non-limiting flowchart 200 illustrating a method for forming thin patterned metal films on substrates using plasma according to one embodiment. At S210, the substrate is cleaned using a cleaning procedure. The cleaning procedure is determined based on the type of substrate. At S220, the certain patterned areas of the substrate are pre-treating by being exposed to a first plasma source of a low-energy and non-thermal plasma.

In an embodiment, the first plasma source provides Oxygen plasma and is set according to a first set of exposure parameters. As noted above, these parameters include, for example, power, frequency, gas flow rate, and time duration. The values of the first set of exposure parameters are determined based, in part, on the type of the substrate. At the end of S220, only desired areas of the surface of the substrate will react with the ink composition. In certain embodiments, S210 and/or S220 are optional. That is, the process disclosed herein can be performed on pre-treated substrates. Such substrates can be pre-treated by a different machine or at a different facility.

At S230, a mask is placed on the treated substrate. In an embodiment, shadow masking is utilized such that a polymeric mask is applied directly to the surface of the treated substrate. In such embodiments, voids (spaces) in the mask define where the ink composition contacts the substrate surface. According to another embodiment, the treated substrate's surface is selectively modified using, for example, photolithographic techniques. According to some embodiments, the substrate includes photoactive functional groups. Thus, once a mask is applied to the substrate, the substrate's surface may be irradiated with any appropriate type of radiation such that only the photoactive groups not covered by the mask are irradiated. This masking technique creates treated and non-treated areas on the substrate. As a result, the treated areas have higher or lower affinity to the components of the ink composition than the non-treated areas.

According to further embodiments, micro-contact printing, chemo-mechanical surface patterning, selective chemical modification, and template assisted patterning or any other appropriate procedure may be utilized for the partial modification of the surface of the substrate. It should be noted that, in certain embodiments, S230 is optional.

At S240, the ink composition is applied on the void areas of the mask. In an embodiment, the ink composition can applied by means including, but not limited to, a drop-casting, spin-coating, spray-coating, immersion, flexography, gravure, inkjet printing, aerosol jet printing, contact imprinting, and the like.

At S250, the substrate including the ink composition is exposed to a second plasma source as determined by a second set of exposure parameters. In an embodiment, the second plasma source provides Argon or Nitrogen plasma. In certain embodiments, the same chamber is used for both the first and second plasma sources. In an optional embodiment, the chamber for the second plasma source is a vacuum chamber. In a further embodiment, the first plasma source may be the same as the second plasma source.

In yet another embodiment, the second plasma source utilized in S250 is atmospheric plasma of inert gas. Exposing the substrate to the atmospheric plasma can be performed using an atmospheric plasma jet, an atmospheric plasma spray, a dielectric barrier discharge, and the like. In all of the above noted embodiments, the second plasma source is of the low-energy and non-thermal plasma.

The second set of exposure parameters include power, frequency, gas flow rate, and time duration. The values of the second set of exposure parameters are determined based, in part, on the type of the substrate 110, the ink composition 130, and/or the means of application.

As a non-limiting example, the values of the second set of exposure parameters may be as follows: the power is between 5 W (watt) and 600 W, the plasma RF frequency is between 50 Hz and 5 GHz, the gas flow rate is between 2 SCCM and 50 SCCM, and the exposure time is between 1 second and 5 minutes.

It should be noted that the plasma RF frequency and the operation power are chosen according to the reduction potential of the metal. Generally, metals with higher reduction potentials require lower plasma RF frequencies and operation powers. The time of exposure is determined according to the metal-cation concentration in the composition, the reduction potential of the metal, and/or the gas flow rate. It is noted that, generally, lower metal-cations concentrations, as well as metals with higher reduction potentials and greater gas flow rates, require a shorter plasma exposure time, since at such conditions the rate of precipitation is higher.

In certain embodiments, S250 may be repeated a predefined number of cycles, and the second set of exposure parameters may be set to different values for each cycle. In an embodiment, the number of cycles may be between 2 and 10. As noted above, the number of cycles determines, in part, the thickness of the metal.

Once the plasma exposure cycle(s) is completed, the substrate may be removed from the chamber. At this point, the ink composition has been converted to a patterned thin metal film, which is adhered to the substrate. As will be discussed herein, the ink composition may be composed of different metal cations, and different contractions thereof. The resulting thin metal film may be comprised of various types of metals and/or alloys. According to some embodiments, the thickness of the thin metal film is between 0.02 μm and 2 μm.

As noted above, the chemical and electrical properties of the patterned thin metal film are determined based on the chemical properties of the composition and the substrate and/or the values of the plasma exposure parameters.

Figure 3:
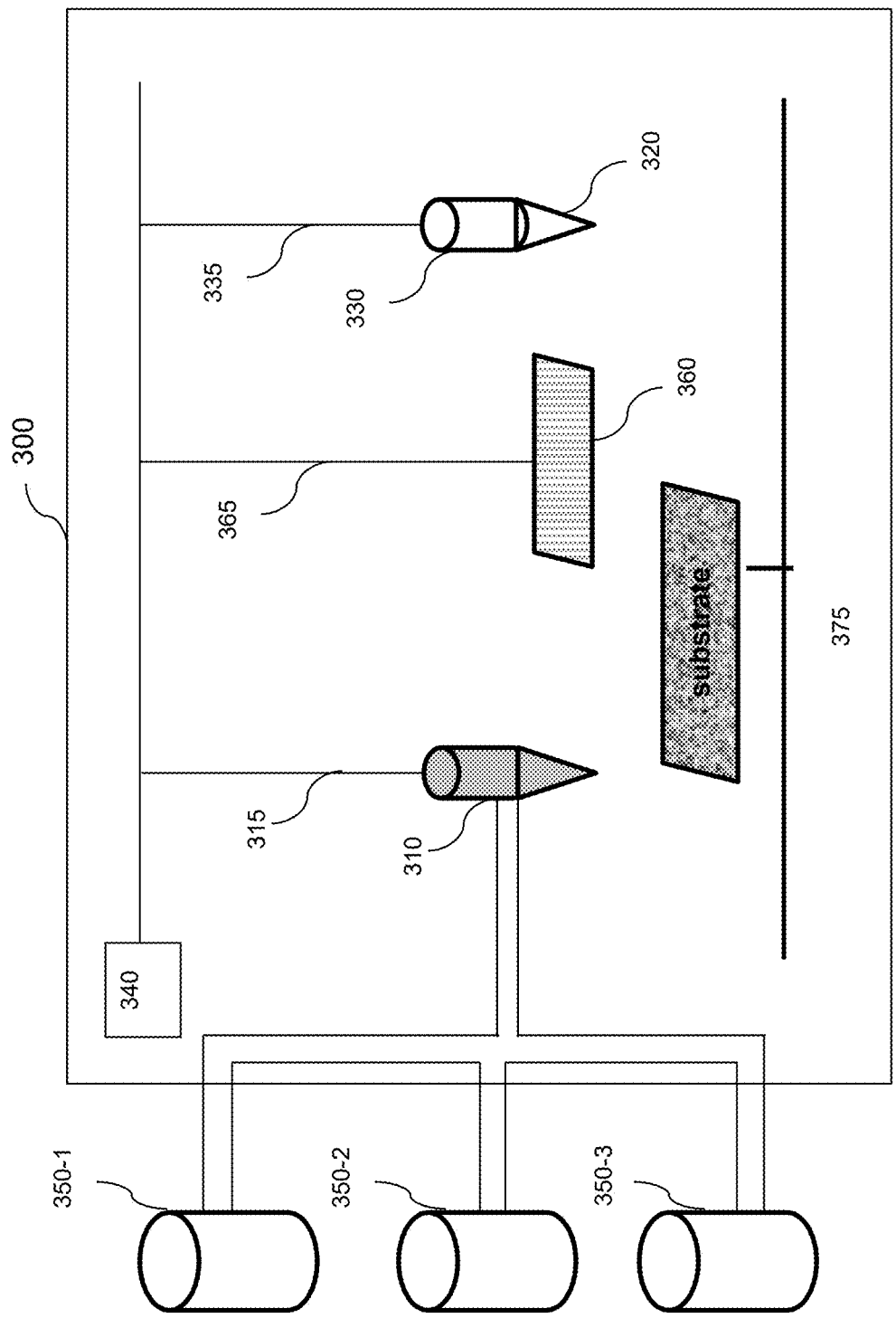
FIG. 3 is a block diagram of a machine structured to form thin patterned metal films on substrates according to the various embodiments disclosed herein.

FIG. 3 shows an exemplary and non-limiting block diagram of a machine 300 structured to form thin patterned metal films on substrates according to the various embodiments disclosed herein. That is, the machine 300 can also serve as a printing machine, a fabrication machine, a manufacturing machine, and the like. The machine 300 can be utilized for mass-production of electronic devices including, for example, RFIDs, electronic sensors, integrated electronic circuits, flexible displays, photovoltaic devices, organic field effect transistors, OLEDs, and the like.

According to some embodiments, the machine 300 includes a plasma jet 310, a nozzle 320 coupled to a container 330 containing the ink composition, and a controller 340. The plasma jet 310 is connected to one or more containers 350-1, 350-$n$ that are the sources for the different plasma gas. For example, containers may include Argon Plasma, Oxygen plasma, Nitrogen plasma, and the like. The containers 350 may or may not be part of the machine 300. The plasma jet 310 is a means for dispensing atmospheric pressure plasma. The plasma jet 310 can be replaced by an atmospheric plasma with corona discharges, and dielectric barrier discharges. The movement of the plasma jet 310 is controlled by a moving arm 315.

In certain embodiments, when vacuum (or low-pressure) plasma is utilized, the plasma jet 310 is a replaced by a vacuum chamber controlled by a vacuum pump (not shown).

The nozzle 320 may be any means for applying the ink composition in the container 330 on the substrate 375. The nozzle 330 may be utilized for drop-casting, spin-coating, spray-coating, immersion, flexography, gravure, inkjet printing, aerosol jet printing, contact imprinting, and the like, and the like. The nozzle 330 may be connected to a moving arm 335 to follow a specific pattern.

In certain embodiments, the machine 300 further includes a masking means 360 for applying the mask on the surface of the substrate. The masking means 360 may be also connected to a moving arm 365. The movement of the masking means 360 is controlled by the moving arm 365.

The controller 340 is configured to control the operation of the various components of the machine 300. For example, the controller 340 can set the exposure parameters for the plasma jet 310, select a plasma source, control the injection casting of the composition, control the movement of the various moving arms, and so on.

The controller 340 can be realized as one or more general-purpose microprocessors, multi-core processors, microcontroller, digital signal processors (DSPs), field programmable gate array (FPGAs), programmable logic devices (PLDs), gated logic, discrete hardware components, and the like. The controller 340 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the controller, cause the controller to perform the various functions described herein.

According to various disclosed embodiments, an ink composition for forming thin metal films on substrate is disclosed. The ink composition may be in a form of a solution, dispersion, suspension, gel, or colloid.

In its basic form, the ink composition includes metal cations with at least one type of solvent. According to some exemplary embodiments, the metal cations are $M(NO_3)_n$, $M(SO_4)_n$, $MCl_n$, and $H_mMCl_{n+m}$, where "M" is a metal atom (or any appropriate metal alloy) with a valence of "n", H is hydrogen, $NO_3$ is nitrate, $SO_4$ is sulfate, Cl is chloride, and "m" is a valence of the counter ion. In a further embodiment, the metal cations may be provided in gels, colloids, suspensions, dispersions, organic-inorganic compounds, and so on. According to some exemplary embodiments, the metal cations may be stabilized by counterion, e.g., forming an organometallic complex, such that they are connected by coordinate bonds rather than by ionic bonds.

The solvents that may be used in the ink composition include, but are not limited to, alcohols, water, toluene, dioxane, cyclohexanol, Dimethyl sulfoxide (DMSO), formamides, ethylene glycol, propylene glycol, glycerol, propylene carbonate, and acetonitrile. In some embodiments, the ink composition can contain other additives such as, but not limited to, organic molecules, polymers, conductive polymers, carbon nanotubes (CNT), densifiers, surfactants, and the like. Such additives can be used to change the viscosity.

The ratio between metal containing compound/metal cation and the concentration of solvents is determined based on the type of the metal being used in the solution. The ratio between the solvents in the mixture can be set for different compositions. That is, concentration of the metal cations in the ink composition can be adjusted based on the ratio between the solvent mixture and the metal cations. In some embodiments, the concentration of the metal cations in the ink composition range between 1% wt. and 70% wt. The entire fraction of the solvent in the ink composition is 100% wt., regardless of the number of solvents in the composition.

That is, in a non-limiting embodiment, when one solvent is used, the entire fraction of the solvent is 100% wt. In another embodiment, when a mixture of two solvents is contained ink composition, the first solvent ranges between 75 wt. % and 99 wt. % and a second solvent ranges between 25 wt. % and 1 wt. %, respective of the first solvent. For example, if the first solvent is 75 wt. %, then the fraction of the second solvent is 25 wt. %. In another non-limiting embodiment, when a mixture of three solvents are contained in the ink composition, then the fraction of the first solvent can range between 75 wt. % and 99 wt. %, the second solvent can range between 1 wt. % and 25 wt. %, and the third solvent can range between 1 wt. % and 25 wt. %, with the total percentage of solvent being 100 wt. %.

In yet another embodiment, the solvent mixtures consist of two different types of solvents: a high surface tension solvent and a low surface tension solvent. Examples for a low surface tension solvent include any alcohol-based solvent, while examples for a high surface tension solvent include a DMSO solvent.

According to one embodiment, the ink composition has a viscosity ranges between 0.001 and 0.5 Pa-s (pascal-second). It should be therefore appreciated that with such viscosity the ink composition can be applied or printed on the substrate by means of inkjet printing.

Non-Limiting Examples

Following are a few non-limiting examples for ink compositions and forming thin metal films using such compositions.

In a first example, the ink composition includes metal cations $AgNO_3$ in the concentration of 40 wt. % in water (solvent). This ink composition is silver-based.

Using this ink composition, a silver thin film can be formed on a PET substrate through the following process. A PET substrate is first treated by an Oxygen plasma with the exposure parameters RF frequency, power, and gas flow rate of the Oxygen plasma are respectively set to the following values: 13 MHz, 50 W, and 5 SCCM Oxygen flow rate. The plasma is applied in a vacuum chamber with a low pressure (e.g., 375 Torr) for 5 minutes through a polymer mask with a void area of 2×2 mm to create a hydrophilic pattern.

The silver-based ink composition is then drop-casted on the treated PET substrate, so that the ink distribution on the substrate follows the pattern. Then, the PET substrate with ink composition is placed in a vacuum chamber and exposed to Argon plasma. The chamber is set with the following exposure parameters RF frequency, power, gas flow rate, and time having the values: 13 MHz, 50 W, 3 SCCM gas flow rate, and 1 minute, respectively. The pressure at the chamber is 375 Torr. As a result, a patterned (silver 2×2 mm square) metal film having thickness of 500 nm (nanometer) on top of the PET substrate without any substrate deformation.

As a second example, the ink composition is made of metal cations $HAuCl_4$ in concentration of 10 wt. % in a mixture of solvents. The mixture includes water and ethanol at a ratio of 90:10 wt. % (water:ethanol). This ink composition is gold-based.

Using this ink composition, a gold thin film can be formed on a silicon substrate through the following process. The silicon substrate is first treated as discussed above with reference to the first example. Here, the exposure time is 5 minutes. Then, the ink composition is drop-casted on the silicon substrate through a polymer mask with a square-shaped void of 5×5 mm to create a square pattern. The silicon substrate with the mask and ink composition are placed in a vacuum chamber and exposed to Argon plasma. The exposure parameters RF frequency, power, gas flow rate, and time are set to 13 MHz, 100 W, 3 SCCM, and 1 minute, respectively. The pressure at the chamber is 375 Torr. As result, a square pattern of a gold metal film having thickness 150 nm is formed on top of the silicon substrate without any substrate deformation.

To thicken the formed film, an additional layer of the ink composition is drop-casted on the silicon substrate through the same polymer mask and placed in the vacuum chamber for another Argon plasma exposure cycle repeated at the same exposure parameters' values as in the first cycle. As a result, the thickness of the formed patterned gold film is 300 nm.

As a third example, the ink composition includes metal cations of $Cu(NO_3)_2$ in concentration of 5 wt. % in solvent mixture. The solvent mixture include water and DMSO at a ratio of 90:10 wt. % (water:DMSO). This ink composition is copper-based.

In this example, a copper film is formed on a glass substrate covered by PEDOT-PSS polymer. The ink composition is drop-casted on the substrate through a mask with a square-shaped void having an area of 2×2 mm and exposed to Argon atmospheric plasma using a plasma jet. The exposure parameters RF frequency, power, gas flow rate, and time are set 100 kHz, 400 W, and 5 SCCM gas flow rate, and 5 seconds, respectively. As a result, a square-shaped copper film having an area of 2×2 mm and a thickness of 120 nm is formed on the glass substrate.

As a fourth example, an ink composition including metal cations of $AgNO_3$ at a concentration of 3 wt. % in a solvent mixture of water, 2-propanol, and DMSO at a ratio of 80:15:5 wt. % (water:2-propanol:DMSO). This ink composition is sliver-based.

Using this ink composition, a sliver thin film can be formed on a PET substrate through the following process. The PET substrate treated by atmospheric plasma jet applying Oxygen plasma. The exposure parameters RF frequency, power, gas flow rate, and time are set to 40 kHz, 300 W, 10 SCCM oxygen flow rate, and 10 seconds, respectively. Then, a pattern of hydrophobic lines 500 µm width is created. The ink composition is printed on the PET substrate following the pattern lines using an ink-jet printer. The printed ink lines are exposed to Argon atmospheric plasma using a plasma jet. The exposure parameters RF frequency, power, gas flow rate, and time of the plasma jet are now set to 40 kHz, 300 W, 5 SCCM flow rate, and 15 seconds. As result, a patterned silver metal film with line width of 500 µm and thickness of 70 nm is formed on the silicon substrate.

As a fifth example, the composition includes metal cations $AgNO_3$ at a concentration of 25 wt. %, CNT at a concentration of 0.02 wt. %, and a solvent mixture. The solvent mixture is of ethanol and water at a ratio of 95:5 wt. % (ethanol:water). The ink composition is printed as a pattern of lines using an ink-jet printer. The printed ink lines are exposed to Argon atmospheric plasma applied using a plasma jet. The exposure parameters RF frequency, power, gas flow rate, and time of the plasma jet are set to 13.54 MHz, 20 W, 5 SCCM argon flow rate, and 5 seconds, respectively. As a result, a pattern of silver metal film with line width of 500 µm and thickness of 200 nm is formed on the PET substrate.

As a sixth example, the ink composition is made of metal cations of $H_2PtCl_6$ in concentration of 15 wt. % in a mixture of solvents. The mixture includes water, propylene glycol and 1-methoxy-2-propanol at a ratio of (1:1:5) (water: propylene glycol:1-methoxy-2-propanol). This ink composition is platinum-based.

Using this ink composition, a platinum thin film can be formed on a plastic substrate through the following process. The plastic substrate is first treated as discussed above with reference to the first example. Here, the exposure time is 10 minutes. Then, the ink composition is sprayed on the plastic substrate and mixed to create an even ink coating. The plastic substrate with the ink composition are placed in a vacuum chamber and exposed to Argon plasma. The exposure parameters RF frequency, power, gas flow rate, and time are set to 13 MHz, 150 W, 30 SCCM, and 10 minutes, respectively. The pressure at the chamber is 0.375 Torr. As result, a coating of a platinum metal film having thickness of 20 nm is formed on top of the plastic substrate without any substrate deformation. The metal film can be continuous, or consist of multiple metal islands, depending on the duration of the ink spraying.

As a seventh example, the ink composition is made of metal cations of $Pd(NO_3)_2$ in concentration of 3 wt. % in a mixture of solvents. The mixture includes propylene carbonate and ethylene glycol at a ratio of (5:2) (propylene carbonate:ethylene glycol). This ink composition is palladium-based.

Using this ink composition, a palladium thin film can be formed on a plastic substrate through the following process.

The plastic substrate is first treated as discussed above with reference to the first example. Here, the exposure time is 3 minutes. Then, the ink composition is inkjet-printed on the plastic substrate in a desired pattern. The plastic substrate with the ink composition are placed in a vacuum chamber and exposed to Argon plasma. The exposure parameters RF frequency, power, gas flow rate, and time are set to 13 MHz, 150 W, 35 SCCM, and 5 minutes, respectively. The pressure at the chamber is 0.375 Torr. As result, a coating of a palladium metal film having thickness of 5 nm is formed on top of the plastic substrate without any substrate deformation.

As an eighth example, the ink composition is made of metal cations of $AgNO_3$ in concentration of 10 wt. % in a mixture of solvents. The mixture includes propanol, propylene glycol and toluene at a ratio of (2:1:5) (propanol:propylene glycol:toluene). This ink composition is silver-based.

Using this ink composition, a silver thin film can be formed on a perovskite-structured substrate through the following process. The ink composition is inkjet-printed on the substrate in a desired pattern. The substrate with the ink composition are placed in a vacuum chamber and exposed to Argon plasma. The exposure parameters RF frequency, power, gas flow rate, and time are set to 13 MHz, 150 W, 30 SCCM, and 1 minute, respectively. The pressure at the chamber is 0.275 Torr. As result, a coating of a silver metal film having thickness of 100 nm is formed on top of the substrate without any substrate deformation or chemical damage.

Figure 4:
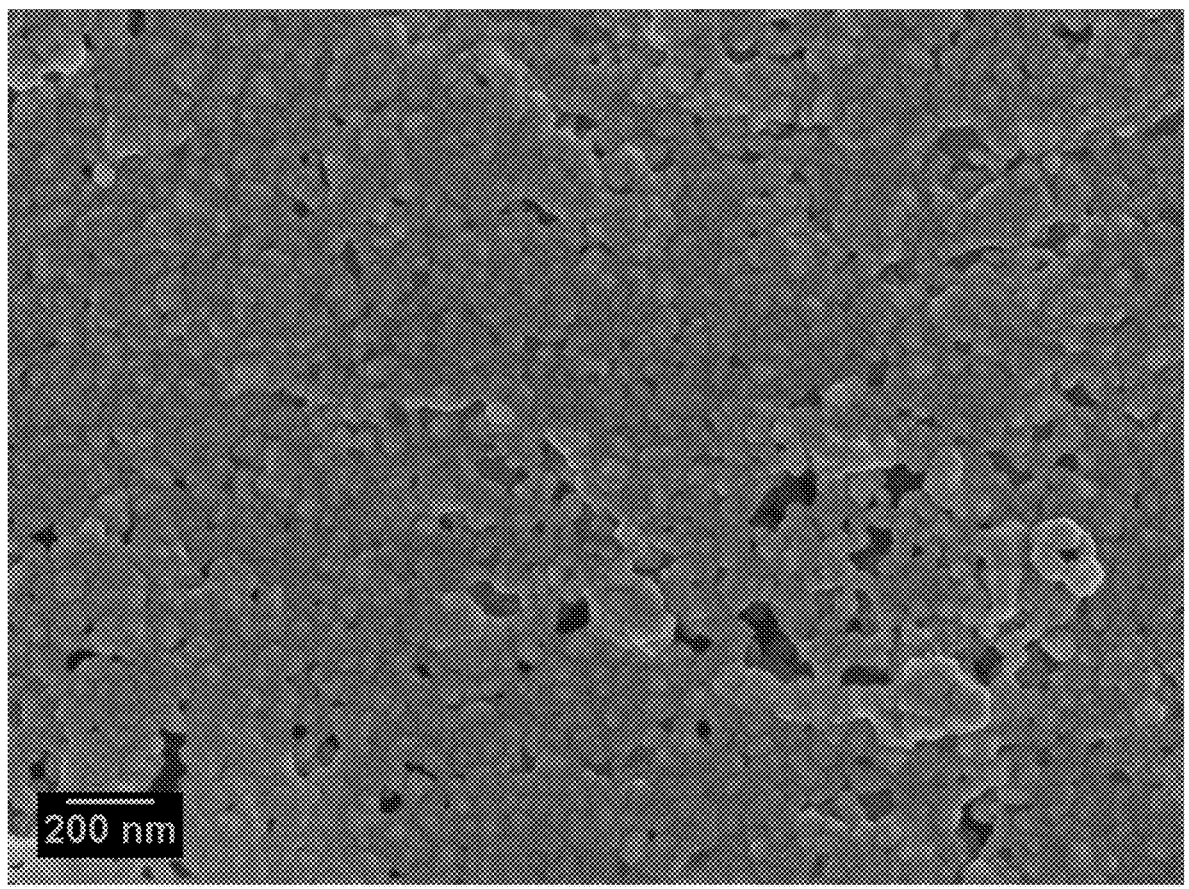
FIG. 4 is a scanning electron microscope (SEM) image of a silver metal film formed on a silicon substrate formed according to an embodiment.

FIG. 4 shows a scanning electron microscope (SEM) image of a silver metal film formed on Silicon substrate according to an embodiment. The film thickness is 150 nm. The plasma used in the second phase is Argon and the exposure time is about 1 minute.

Figure 5:
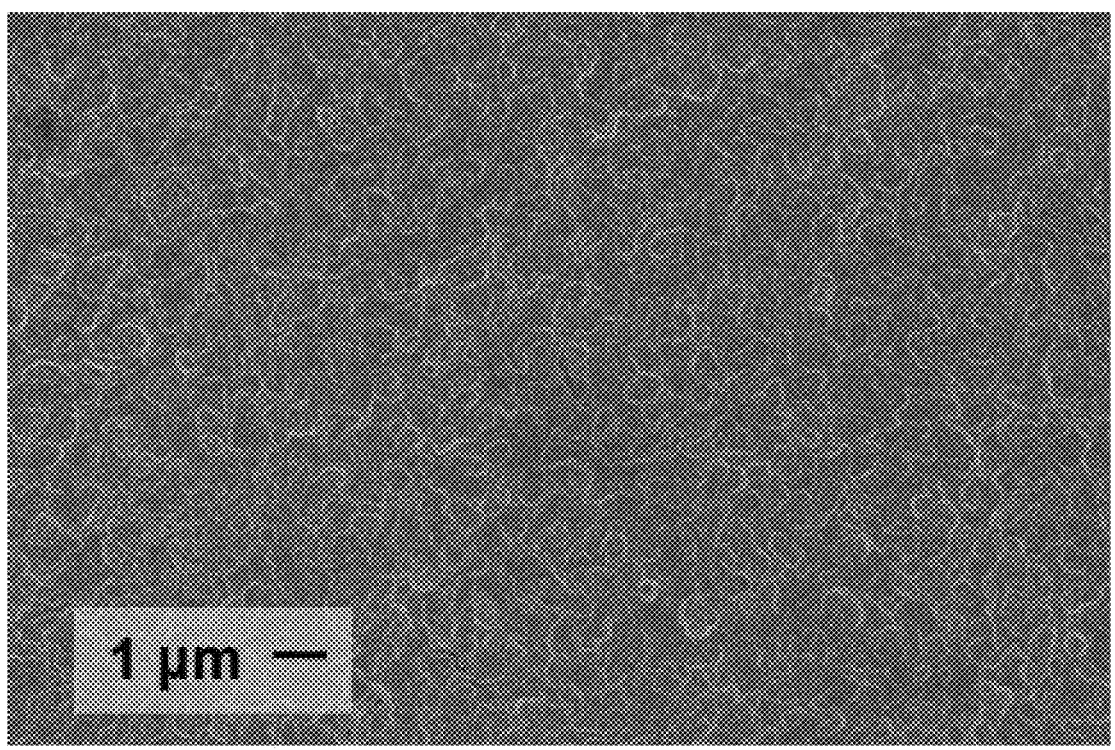
FIG. 5 is a SEM image of a gold metal film formed on a PET substrate formed according to an embodiment.

FIG. 5 shows a SEM image of a gold metal film formed on a PET substrate according to an embodiment. The plasma used in the second phase is Argon with exposure parameters RF frequency, power, gas flow rate, and time of the plasma jet set to gold film: 13.54 MHz, 5 SCCM argon flow, 30 W, 1 minute, respectively. The formed gold metal film having thickness is 200 nm.

The embodiments have been described in detail referring to the above examples. It should be appreciated that the disclosed embodiments are not limited to the examples described above, and details of the various embodiments may be variously modified.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An ink composition for forming a patterned thin metal film on a substrate, comprising:
   metal cations;
   at least one solvent; and
   at least one additive for changing the viscosity of said ink composition;
   wherein the patterned thin metal film is formed on a surface of the substrate upon exposure of the at least metal cations to a low-energy plasma; wherein the at least one solvent is a mixture of at least two types of solvents; and wherein the at least two types of solvents include at least a high surface tension solvent that is glycol-based solvent or Dimethyl sulfoxide (DMSO) and a low surface tension solvent that is alcohol-based solvent; wherein the metal cations include $AgNO_3$; wherein the concentration of the metal cations is in the range from 3 wt. % to 40 wt. %.

2. The ink composition of claim 1, wherein the mixture of solvents includes water, 2-propanol, and DMSO at a ratio of 80:15:5 wt. % (water:2-propanol:DMSO).

3. The ink composition of claim 1, wherein the mixture of solvents includes ethanol and water at a ratio of 95:5 wt. % (ethanol:water).

4. The ink composition of claim 1, wherein the mixture of solvents includes propanol, propylene glycol and toluene at a ratio of (2:1:5) (propanol:propylene glycol:toluene).

5. The ink composition of claim 1, wherein a temperature of the surface of the substrate upon exposure to the low-energy plasma is between 50° C. and 70° C., inclusive.

6. The ink composition of claim 1, further comprising:
   counterions for stabilizing the metal cations.

7. The ink composition of claim 1, wherein the at least one additive is any of: organic molecules, polymers, conductive polymers, carbon nanotubes (CNT), densifiers, organic solvents, and surfactants.

8. The ink composition of claim 1, wherein the ink composition is in a form of any of: a solution, a dispersion, a suspension, a gel, and a colloid.

9. The ink composition of claim 1, wherein the at least one high surface tension solvent is any of: Dimethyl sulfoxide (DMSO), ethylene glycol, propylene glycol, glycerol, and propylene carbonate.

10. The ink composition of claim 1, wherein the substrate is any one of: an organic substrate, an inorganic substrate, a hybrid organic-inorganic substrate, a ceramic substrate, a silicon substrate, and a glass substrate.

11. The ink composition of claim 1, wherein the substrate is any one of: a polyethylene terephthalate (PET) substrate, a polyimide substrate, and a polyethylene naphthalate (PEN) substrate.

12. The ink composition of claim 1, wherein the low-energy plasma is an inert gas plasma.

13. The ink composition of claim 1, wherein the low-energy plasma includes at least any of: an Argon plasma, a Nitrogen plasma, and an Oxygen plasma.

14. The ink composition of claim 1, wherein the ink composition is applied on the substrate by means including at least any of: drop-casting, spin-coating, spray-coating, immersion, flexography, gravure, inkjet printing, aerosol jet printing, and contact imprinting.

15. An ink composition for forming a patterned thin metal film on a substrate, comprising:
    metal cations;
    at least one solvent; and
    at least one additive for changing the viscosity of said ink composition;
    wherein the patterned thin metal film is formed on a surface of the substrate upon exposure of the at least metal cations to a low-energy plasma; wherein the at least one solvent is a mixture of at least two types of solvents; and wherein the at least two types of solvents include at least a high surface tension solvent that is glycol-based solvent or Dimethyl sulfoxide (DMSO) and a low surface tension solvent that is alcohol-based solvent; wherein the metal cations include $H_2PtCl_6$ in concentration of 15 wt. % in a mixture of solvents; wherein the mixture includes water, propylene glycol and 1-methoxy-2-propanol at a ratio of (1:1:5) (water: propylene glycol:1-methoxy-2-propanol).

16. An ink composition for forming a patterned thin metal film on a substrate, comprising:
    metal cations;
    at least one solvent; and
    at least one additive for changing the viscosity of said ink composition;
    wherein the patterned thin metal film is formed on a surface of the substrate upon exposure of the at least metal cations to a low-energy plasma; wherein the at least one solvent is a mixture of at least two types of solvents; and wherein the at least two types of solvents include at least a high surface tension solvent that is glycol-based solvent or Dimethyl sulfoxide (DMSO) and a low surface tension solvent that is alcohol-based solvent; wherein the metal cations include $Pd(NO_3)_2$ in concentration of 3 wt. % in a mixture of solvents; wherein the mixture includes propylene carbonate and ethylene glycol at a ratio of (5:2) (propylene carbonate: ethylene glycol).

* * * * *